United States Patent [19]

Hunninghaus

[11] Patent Number: 5,060,134
[45] Date of Patent: Oct. 22, 1991

[54] ACTION DIRECTION PORT EXPANSION CIRCUIT AND SYSTEM

[75] Inventor: Roy E. Hunninghaus, Des Plaines, Ill.

[73] Assignee: Motorola, Inc., Schaumburg, Ill.

[21] Appl. No.: 194,677

[22] Filed: May 12, 1988

[51] Int. Cl.⁵ .............................................. G06F 1/04
[52] U.S. Cl. .................... 364/200; 364/200; 364/900; 123/371
[58] Field of Search .............. 364/200, 900, 431.01, 364/431.04, 431.02, 431.11, 431.14, 431.12; 123/371

[56] References Cited

U.S. PATENT DOCUMENTS

| | | | |
|---|---|---|---|
| 4,086,884 | 5/1989 | Moon et al. | 123/480 |
| 4,095,267 | 6/1978 | Morimoto | 364/200 |
| 4,467,420 | 8/1984 | Murakami et al. | 364/200 |
| 4,500,961 | 2/1985 | Engles | 364/200 |
| 4,575,794 | 3/1986 | Veneski et al. | 364/200 |
| 4,866,598 | 9/1989 | Sonneek et al. | 364/200 |
| 4,964,050 | 10/1990 | Yakuwa et al. | 364/431.04 |

OTHER PUBLICATIONS

Pages 1 through 4 and Drawing FIGS. 1–4 of Motorola Patent Disclosure A-872.
Literature for the Advanced Micro-Device AM9513, pp. 1-2, 1-6, 1-11 and 1-29.
Literature for the Advanced Micro-Device NEC 78312, pp. 101 through 111.

Primary Examiner—Michael R. Fleming
Assistant Examiner—Christopher B. Shin
Attorney, Agent, or Firm—Phillip H. Melamed

[57] ABSTRACT

Circuitry is provided which effectively expands one, and preferably two or more, high resolution timed outputs of a microprocessor device such that a larger number of output signals are selectively, and independent of one another, switched to output states at times determined in accordance with the occurrence of the timed outputs of the microprocessor. Essentially, high resolution event time occurrence information is provided by a microprocessor dedicated output port. Previously, information on a microprocessor data bus and address bus is utilized to selectively enable certain desired ones of a plurality of output latches and determine the next desired state of such enabled latches. All of the output latches effectively receive the high resolution timed output signal of the microprocessor. The result is an advantageous and cost effective high resolution expansion of the microprocessor outputs. Preferably the microprocessor has two dedicated timed output ports which effectively implement control of three or more independently operative output devices, such as fuel injectors of an automotive control system and/or spark/dwell or knock sense circuitry of such a system.

25 Claims, 5 Drawing Sheets it applies generally to the field of circuits and systems which receive information from a limited number of output pins and attempt to effectively expand this information so as to drive a larger number of output devices which may, in general, have to be separately controlled. The present invention has particular application with regard to effectively expanding the number of dedicated timed output pins provided on a microprocessor so that the microprocessor can effectively control a large number of output devices which may have to be independently controlled. A particular application of the present invention is with respect to utilizing two output ports of a microprocessor, such as a 68HC11 manufactured by Motorola, so as to implement an automotive control system which can independently control four, six or eight fuel injectors. Then other timed output ports of the microprocessor can be used to control other engine control functions such as spark/dwell.

Several previous microprocessors have been utilized for automotive engine control, such as the the 68HC11 and 6801 Motorola microprocessors. Some prior microprocessor systems constructed command words based on a specific time event occurrence, and then used these command words to address various output devices and implement the proper state changes. The time occurrence of these state changes was determined in accordance with the transmission of the command word which was created. Timing resolution (the ability to rapidly provide for changes in data) for some of these systems suffered because of the inherent delay in producing the command word, serially sending it and then subsequently decoding it so as to control the various outputs. Thus rapid updating of information suffered since, in general, change could not occur sooner than the time to create, transmit and decode a command word.

Some systems utilized a high resolution timing signal at a dedicated output port of a microprocessor to directly control the time occurrence of a state change of an output signal. These prior systems recognized the need for providing a large number of high resolution (accurate) timed output signals so as to drive a corresponding number of engine control devices, such as fuel injectors. However, these prior systems provided a limited number of dedicated microprocessor output pins at which a high resolution timed output signal could be produced. These dedicated output pins are in addition to the large number of output pins which comprise the data bus and address bus utilized by the microprocessor to send low resolution (with respect to time occurrence) address and data information to various different devices. Thus, if separate, precise independent control of, for example, four, six or eight fuel injectors were required, prior systems would attempt to utilize four, six or eight dedicated output pins of the microprocessor, each separately controlling a different fuel injector. This is fine, unless you run out of dedicated high resolution output pins on the microprocessor, and no matter how many such pins are provided, there will always be some application which requires more dedicated output pins than are available.

Thus, there is a need for expanding the output capabilities of a microprocessor such that a larger number of high resolution timed outputs can be provided from one dedicated, high resolution timed output of the microprocessor. This should be accomplished in a cost effective manner such that substantial additional hardware is not required. Also, excessive time-consuming software programming and execution time should not be required since this would degrade the overall system response by requiring the microprocessor to make an excessive amount of calculations prior to providing a desired high resolution timed output signal.

The present invention addresses these problems and is believed to overcome them by providing a circuit configuration which readily expands the effective, high resolution output signals provided by a microprocessor in a cost effective manner without any substantial degradation in timing resolution. This is accomplished while permitting independent control of each of the expanded output signals which are produced.

SUMMARY OF THE INVENTION

An object of the present invention is to provide circuitry to enable the expansion of high resolution timed output signals so that these signals can be utilized for the separate and independent control of various output devices wherein this is implemented in a cost effective manner which does not substantially degrade the timing resolution of the high resolution output signal being expanded.

In one embodiment of the present invention, an action direction port expansion circuit for effectively directing timed output signal transitions/pulses to implement desired changes at a plurality of output ports is provided. This action direction port expansion circuit comprises: first event timer terminal for receiving first event signal transitions/pulses; a plurality of output latch means each coupled to said first event timer terminal and each providing an associated output signal having any of at least two different states, each of said output latch means effectively receiving said first event signal transitions/pulses and, each selectively in response thereto, and also in response to the receipt of an associated effective first enable signal, setting the state of its associated output signal to a predetermined state at a time determined by the time occurrence of said first event signal transitions/pulses; and a plurality of first event action (transfer mask) latch means, each one of said first event action latch means associated with and coupled to a separate associated one of said plurality of output latch means for selectively providing, as a latched output of said each one of said first event action latch means, said first event enable signal provided to said associated one of said output latch means and providing for enabling said associated one of said output latch means while others of said output latch means are unaffected by said first event enable signal which enables said associated one of said output latch means, whereby the time occurrences of said first event signal transitions/pulses provide precise timing information for changing the states of any of said output latch means output signals while said first event action latch means determine which of said output latch means are to react to said first event signal transitions/pulses.

Essentially, the present invention utilizes the time occurrence of a high resolution timed output signal, preferably provided at a microprocessor dedicated output port, to determine when output signal states should change. The invention also utilizes desired state information and information as to whether or not an output state should be changed in response to a particular timed high resolution output signal, to effectively actuate any of a plurality of output latches which provide a desired plurality of expanded output signals. Thus, essentially each output signal of the output latches is controlled in accordance with three characteristics, what time should the output state change at, should there be a change in the output state of the output signal and what should the final resultant state of the output signal be. For optimum flexibility of a system, each of these parameters of when, what and if should be independently controlled, and the present invention provides circuitry which can implement such independent control.

The present invention has particular application to the control of sequential fuel injectors for an engine control system. In such a system, in general, the on-duration of one fuel injector may overlap such that a second injector may be turned on while a first injector still remains on. Also, in general, the first injector may be turned off either prior to or after the turning on of the second injector. Thus, it is clear that the on/off states of fuel injectors should have the ability to be independently controlled since their duty cycles can overlap. In such a case, the present invention proposes the use of two high resolution output ports of a microprocessor to provide at least four separate drive signals for four of the fuel injectors, and even provides for an additional four output signals which are independently controllable by the two high resolution output signals of the microprocessor. One of these additional four signals can control an additional function such as an engine control knock sense time window or ignition spark/dwell timing.

A key feature of the present invention is that each expanded output signal is the output of an output latch which has associated with it an "action direction" latch, sometimes also termed a "transfer mask" latch. This action direction latch essentially determines if the output latch should or should not react to various high resolution timing pulses provided to the output latch to implement an output state change. In this manner, each output latch, and therefore each output signal, is independently controllable in accordance with the present invention. Preferably, this is accomplished without requiring any recalculation or monitoring of any of the output states which are not to be changed. The present invention essentially implements single data bit control for determining whether or not each expanded output should be altered in response to a timed event.

An additional feature of the present invention comprises reset circuitry which essentially insures that after each high resolution timed event signal, the microprocessor must re-enable an output latch in order to have the next timed event signal implement a change by the output latch. This provides immunity from unintentional state changes.

All of the above features of the present invention, as well as additional features and advantages thereof, can best be understood by reference to the subsequent more-detailed explanation of the embodiments of the present invention.

BRIEF DESCRIPTION OF THE DRAWINGS

For a more complete understanding of the invention, reference should be made to the drawings, in which.

DESCRIPTION OF THE PREFERRED EMBODIMENTS OF THE INVENTION

Figure 1:
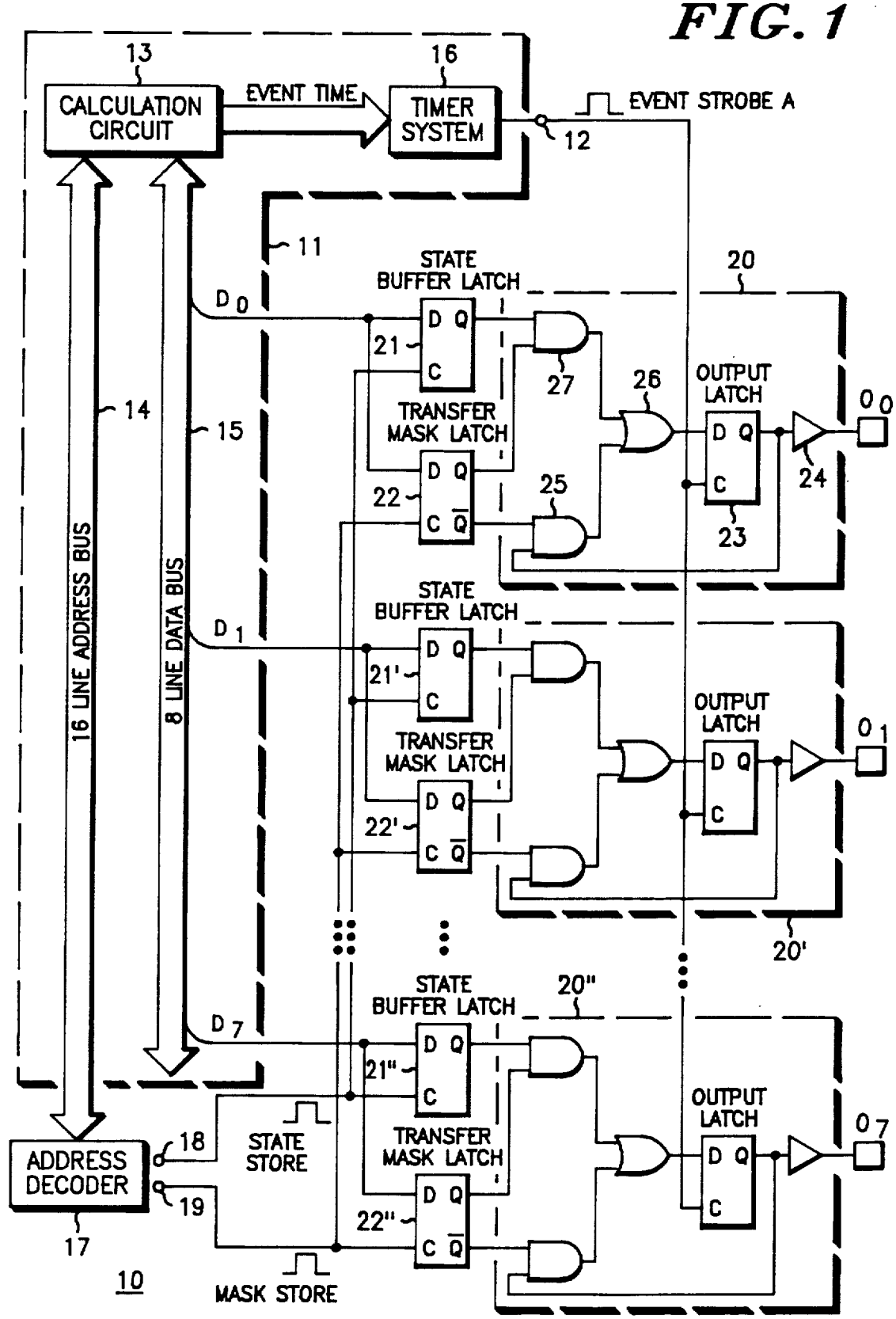
FIG. 1 is a schematic diagram of an action direction port expansion system in which one event timing signal provided by a microprocessor can be expanded into eight independent driving output signals.

Referring now to FIG. 1, an action direction port expansion system 10 is illustrated in which a microprocessor 11 (shown dashed) provides a high resolution timed output signal A (referred to as an event strobe) at a terminal 12 corresponding to a dedicated pin output of the microprocessor. The microprocessor can comprise any of a number of conventional microprocessors such as the 6801 or 68HC11 microprocessors made by Motorola. The microprocessor includes, as is conventional with all microprocessors, some internal calculation circuit 13, as well as a 16-line (16-bit) address bus 14 and an 8-line (8-bit) data bus 15 connected to the calculation circuit. In FIG. 1, the calculation circuit 13 is illustrated as providing an event time signal as an input to a timer system 16 which essentially responds to the event time signal by providing the high resolution timed output event strobe signal A at the terminal 12 at a predetermined subsequent precise time. Thus the timer system 16 essentially comprises holding registers and counter registers so as to produce a proper event strobe pulse/transition at a proper desired time in accordance with calculations made by the microprocessor. While such circuitry is conventional, timer systems such as the timer system 16, are relatively complex, and therefore the number of such timer systems, which are required for each dedicated high resolution timed output signal, should be minimized in any practical system. The present invention will minimize the use of such timer systems while still providing for expanded high resolution timed control of a large number of output signals.

The 16-bit address bus 14 is coupled as an input to an address decoder 17. In response to one specific address on the address bus 14, the address decoder will provide, at an output terminal 18, a state store pulse, whereas in response to a different specific address on the 16-bit address bus, the address decoder will provide, at an output terminal 19, a mask store pulse. Thus, the address decoder merely produces appropriately-timed short duration pulses at the terminals 18 and 19 in response to the calculation circuit generating specific addresses which are then decoded by the decoder 17. This operation is conventional. The significance and utilization of the state store and mask store signals at the terminals 18 and 1 will be explained subsequently.

The data bus 15 comprises eight individual lines, each of which, while also connected internally to other parts of the microprocessor, is also brought outside of the microprocessor as one of eight separate data output lines $D_0$ through $D_7$. The data on lines $D_0$ to $D_1$ will be utilized by the present invention to determine if an output state of an output signal should be changed in response to a timed event occurrence, and also to determine what that output state should be changed to, if a change is to be implemented.

The system 10 includes a plurality of eight output latch means 20 shown dashed in FIG. 1, eight associated state buffer latches 21 and eight associated transfer mask latches 22, respectively. For convenience, only three stages, comprising sets of associated components, are shown in FIG. 1, with each stage designated by either non-prime, prime, or double prime reference number notation. Each of the output latch means 20 is separately coupled to the terminal 12 and the event strobe signal present at that terminal. Each latch means, selectively in response to the event strobe signal, and also in response to receipt of an associated effective first enable signal, will set the state of its associated output signal, provided at associated output terminals $O_0$ through $O_7$, respectively, to a predetermined state at a time determined by the time occurrence of the event strobe signal at the terminal 12. Essentially, the state buffer latch 21 determines what state will be provided at the output terminal of its associated output latch means 20 and the transfer mask latch 22 determines if a state change should occur for its associated output latch means in response to the event strobe at the terminal 12. The connections of the components 20, 21 and 22 will now be discussed wherein it should be noted that identical circuit configurations are utilized for all the sets of associated components comprising an output latch means and its associated buffer latch and transfer mask latch.

Within the output latch means 20, a D-type flip-flop circuit 23 has its clock terminal C connected to the terminal 12, and its output terminal Q connected through a buffer stage 24 to the output terminal $O_0$, as well as connected as an input to an AND gate 25. The D-type flip-flop 23 can be considered as an output latch. The AND gate 25 provides an output to an OR gate 26 whose output is connected to a data terminal D of the latch 23 wherein the OR gate also receives an input from an AND gate 27. Two inputs of the AND gate 27 are provided by connections to Q output terminals of the state buffer latch 21 and the transfer mask latch 22, which also comprise D-type flip-flop circuits. A not-Q output of the transfer mask latch 22 is connected as an input to the AND gate 25. Data terminals D of the buffer latch 21 and mask latch 22 are each connected to the $D_0$ data line of the data bus 15. A clock terminal C of the buffer latch 21 is connected to the terminal 18, while a clock terminal C of the latch 22 is connected to the terminal 19. The connections of other component sets having prime and double prime notation is identical, except the data lines $D_1$ and $D_7$ are used, respectively, instead of $D_0$. The operation of the system 10 will now be explained with respect to the components shown in FIG. 1.

Essentially, the microprocessor 11, via the calculation circuit 13 and timer system 16, produces a high resolution timed signal at the terminal 12, comprising the event strobe signal A. At a time substantially coincident with the time occurrence of the high resolution strobe signal 12, it is desired to change any one or more of the states of the output signals present at the output terminals $O_0$ through $O_7$. This is implemented by the present invention in the following manner.

Prior to the occurrence of the event strobe signal at the terminal 12, the calculation circuit will essentially identify which of the output signals $O_0-O_7$ should be changed by the event strobe signal A to be produced and what the resultant output states for the changed output signals should be. In order to identify what the final state of the output signals should be, the address bus will generate a state store signal at the terminal 18 that results in the state buffer latches 21 loading into their output terminals Q the data which is then present on the data bus 15 during the state store signal. The calculation circuit 13 will insure that data on the lines $D_0-D_7$ will correspond to the desired output state for the output, or outputs, which are to be changed.

In order to determine which of the output signals $D_0-D_7$ is to be altered or set in response to the event strobe at the terminal 12, the calculation circuit 13 will also, prior to the event strobe, use the address bus 14 to produce a mask store signal at the terminal 19. In response to the mask store signal, each of the transfer mask latches 22 will store, at its Q and not-Q terminals either one or zero states in accordance with the data which existed on the data bus 15 at the time the mask store pulse is produced. In this manner, the microprocessor 11 will store in the mask latch 22 information as to whether or not the output of the output latch means associated with a specific mask latch is to be changed in response to the event strobe. In response to the state store signal at the terminal 18, the state buffer latch 21 associated with that output latch means will have stored in it, at its output terminal Q, the desired output state to be provided for the output signal of the output latch means at the time of the event strobe. All that is necessary is that the appropriate state store and mask store signals at the terminals 18 and 19, which are associated with and determine what changes occur in response to the occurrence of any event strobe signal to be produced at the terminal 12, occur prior to the event strobe time occurrence. Since the time occurrence of all the necessary signals can be controlled by suitable programming of the calculation circuit 13, this represents no problem. The manner in which the buffer latch and mask latches produce the desired result is more fully explained in the next paragraph.

If, in response to a mask store pulse at the terminal 19, the transfer mask latch 22 stores a zero state at its Q output terminal, this will essentially mask any output of the buffer latch 21 from affecting the input data received by the output latch 23. This is due to the operation of the AND gate 27. However, a zero state at the Q terminal of the mask latch 22 means a one state is present at the not-Q terminal of latch 22. This means that the AND gate 25 will now essentially pass the existing output of the output latch 23, present at its Q terminal, to the data terminal D of the output latch 23. Thus, for a zero Q state of the mask latch 22, when an event strobe occurs, the output latch 23 will not change state. If the transfer mask latch 22 has a one state at its Q terminal, then the AND gate 25 prevents the current output of the latch 23 from affecting the data to be provided at the D terminal of the latch 23. Instead, now the AND gate 27 and OR gate 26 will provide whatever data is present at the output terminal Q of the buffer latch 21 as input data for the latch 23 which data will be read in response to the time occurrence of the event strobe signal A at the terminal 12.

The end result is, when considered in the context of eight different sets of output latch means 20, buffer latches 21 and transfer mask latches 22, the microprocessor 11 can effectively enable any of the output latch means 20 to react to any event strobe pulse at the terminal 12 so as to change the output signal of any of the output latch means in accordance with the data in the buffer state latches 21. The selection of which output latches 23 are to react to the event strobe by changing their outputs in accordance with the data in their associated buffer latches 21, is performed by the transfer mask latch 22. The selection of what data will be provided as an input to the output latch 23 when a change in output is desired is determined by the state buffer latch 21 which receives its data from the calculation circuit 13. The end result is that only the output latch means 20 which are enabled by the calculation circuit 13 via the transfer mask latches will respond to the event strobes at the terminal 12 to change their output signals. The states of these output signals for the enabled latch means 20 will be set in accordance with the information in the associated state buffer latches 21 which information is determined by the calculation circuit 13.

Note that the critical timing for setting the states of the output signals $O_0$ through $O_7$ will occur in accordance with the timed occurrence of the event strobe signal A at the terminal 12. However, now it is not necessary to reconstruct all of the data for all of the output signals $O_0-O_7$. The only significant data to be provided in the state buffer latches 21 will be the data stored therein for the outputs latches selectively enabled in accordance with the data provided in the transfer mask latches 22. All of the state and enable information can be previously stored in the buffer and transfer mask latches by virtue of the previously occurring state store and mask store signals at the terminals 18 and 19. The calculation circuit 13, therefore, does not have to accurately determine output logic states for outputs which do not have to be changed. It just has to select which outputs require a change and what the desired change is. This greatly simplifies the operation of the system 10, since otherwise it would be necessary for the microprocessor to accurately continually create and store logic states for each of the desired output signals $O_0$ through $O_7$ because each effective output latch means 20 would essentially be enabled in response to each event strobe. The advantage of the present system is that only selective ones of the output latches 20 are enabled for changing states. This means that it is not necessary to insure that latches, such as the state buffer latch 21, contain accurate data if the associated output latch means 20 is not enabled so that it will respond to an event strobe by changing states.

The system in FIG. 1 is applicable to any expansion of a single event strobe timed occurrence. In accordance with this system, a single event strobe signal can be utilized to provide a substantial number of independent output signals. Control of eight of such output signals in accordance with a single high resolution signal (event strobe signal A) is provided for in FIG. 1, but clearly any other number of signals could be provided as desired.

Figure 2:
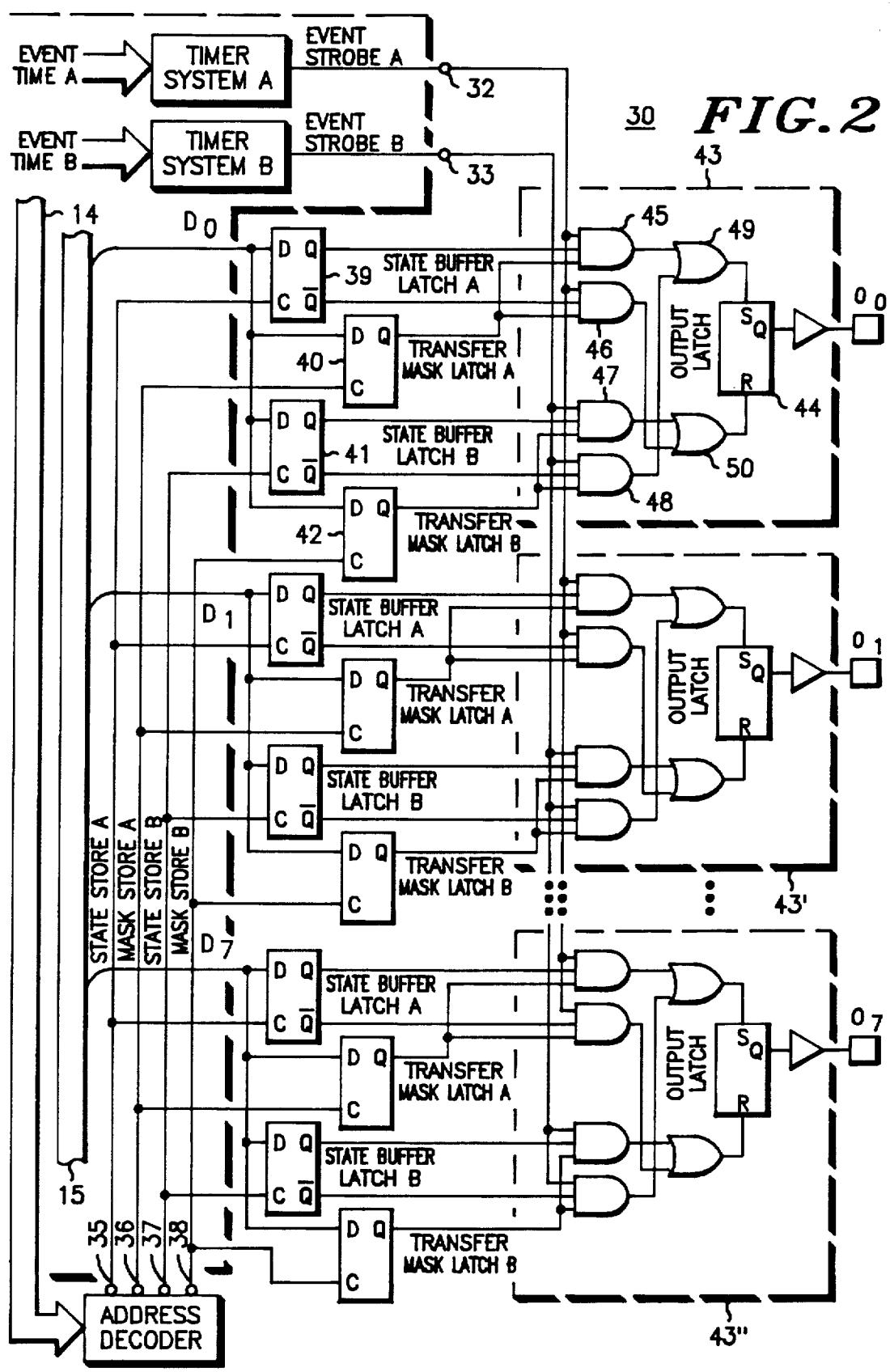
FIG. 2 is a schematic diagram of a system in which two independent time event signals can be utilized to independently control the states of eight different output signals.

The present invention has recognized that in some instances it may be necessary to implement state changes at time periods very close to one another. In such a case, perhaps the maximum repetition rate of the event strobe signal A at the terminal 12 does not provide the desired timing resolution. Thus, for example, if event strobes can only be produced at the terminal 12 every 2 microseconds, and it is necessary to produce output state changes within 1 microsecond of one another, the system in FIG. 1 will not provide such a function. What this means is that in some situations, it may be necessary to provide a separate and independent event strobe signal B, in addition to the event strobe signal A provided at the terminal 12 in system 10. In FIG. 2, a generalized two event strobe system 30 is illustrated in which two separate event strobe signals A and B are utilized to provide separate timed control of eight output signals. This is accomplished as follows.

Referring to FIG. 2, it should be noted that components in the system 30 which are substantially identical to those in the system 10 are identified by identical reference numbers. This convention, as well as the convention of using non-prime, prime and double prime notation to designate three of eight identical stages, is used for all of the FIGS. 1-5. Also, while each FIG. illustrates a microprocessor, not all internal components of the microprocessor are shown in each FIG.

In the FIG. 2 system 30, a microprocessor 31 is illustrated which substantially corresponds to the microprocessor 11 in FIG. 1, except that now two different timer systems A and B are provided instead of the single timer system 16. Each timer system produces a strobe event signal A or strobe event signal B at dedicated output ports 32 and 33 of the microprocessor, respectively. Again, a calculation circuit 13 and address and data busses 14 and 15 (not fully shown in FIG. 2) are provided within the microprocessor 31, and the address bus 14 is connected to an address decoder 34 which essentially represents an expanded version of the address decoder 17 shown in FIG. 1. In response to appropriate address codes being present on the data bus 14, the address decoder 34 produces appropriate state store A, mask store A, state store B or mask store B outputs at terminals 35 through 38, respectively. The terminals 35-38 are coupled to associated buffer and transfer mask latches 39-42, respectively. Each of the latches 39-42 essentially comprises a D-type flip-flop. The pair of A signal buffer and mask latches 39 and 40 and the pair of B signal buffer and mask latches 41 and 42 are essentially configured identical to and function identically as the buffer and mask latches 21 and 22 in the system 10, with each having its data terminal D connected to a single common bus data line such as $D_0$.

In the system 30 in FIG. 2, a somewhat different configuration is illustrated for an output latch means 43 (shown dashed) which is associated with the latches 39 through 42. This different configuration enables either the event strobe signal A at the terminal 32 or the event strobe signal B at the terminal 33 to provide either an effective on or off (one or zero) output state setting for the output signal of the output latch 43 in accordance with the signals provided to the latches 39 through 42. It should, of course, be noted that in FIG. 2, there are, preferably, eight different sets of associated output components wherein each set comprises an output latch means 43 and its associated buffer and mask latches corresponding to the latches 39 through 42.

For the output latch means 43 in FIG. 2, the D-type output latch 23 shown in FIG. 1 has essentially been replaced by an R-S (reset and set) latch 44 whose Q output state is connected through a buffer to the output terminal $O_0$. For the FIG. 2 implementation of the latch means 43, essentially the event strobe signals at the terminal 32 and 33 are logically ANDed with the outputs of the buffer and mask latches 39 through 42 by a plurality of AND gates 45 through 48, acting in conjunction with OR gates 49 and 50, configured as shown in FIG. 2. If a one logic state is present at the Q output of one of the A or B mask latches 40 or 42, and a one logic state is present at the Q output of the associated A or B buffer latches 39 or 41, the output latch 44 will be set to a logic one in response to the event strobe pulse A at the terminal 32 or the event strobe pulse B at the terminal 33, respectively. Similarly, if a one logic state is present at the not-Q output of the buffer latches 39 or 41, while the mask latches 40 or 42 have a one logic state output, then, in response to the associated event strobe, the output latch 44 will be reset to a zero logic state. If a zero output is present at the output of the mask latch 40, then the output latch 44 will not react (not be enabled to change its output) in response to the event strobe signal at the terminal 32, and a zero logic state for the Q output of the mask latch 42 will similarly result in the output latch 44 being nonresponsive to the event strobe signal B at the terminal 33 for the system 30.

The configuration shown in FIG. 2 for the system 30 shows an advantageous implementation for effectively utilizing two independent strobe event signals A and B to selectively set or reset an output signal $O_0$ to either a low or high level by virtue of the output latch 44. Use of two different independent strobe signals A and B produced by the microprocessor 31 provides the flexibility of having output state changes occur more rapidly than the repetition rate which is possible for either of the strobe pulses A and B at the terminals 32 or 33. As is shown in FIG. 2 for the system 30, clearly this system can be readily expanded to provide independent control of eight different output signals $O_0$–$O_7$ which have states controllable by the microprocessor 31. For the system 30 only two high resolution timed outputs of the microprocessor 31 are used to determine the time occurrence of the state changes of the output signals $O_0$–$O_7$. The maximum repetition rate of the high resolution timed output signals of the microprocessor does not form a substantial limitation in how rapidly the output signals $O_0$–$O_7$ can have their states altered. Of course, still the appropriate store and mask signals and their accompanying data on the data bus 15 have to be provided prior to the occurrence of the event strobe signals, but this does not present any substantial time resolution degradation since high resolution timed signals A and B are still directly used for determining the time occurrences of state changes for the output signals $O_0$–$O_7$.

In some sequential control situations it is known that for one event strobe none of the output signals $O_0$ through $O_7$ will ever be required to be set to a logic state at the exact same instant of time that another of the output signals $O_0$–$O_7$ is set to a logic state. In such a case, a common state buffer latch can be used for all of the output latch means, and thus reduce the number of state buffer latches for such a system. Such a special application can comprise the sequential actuation of automotive control fuel injectors in which the fuel injector for each cylinder will be turned on sequentially at different times, and these fuel injectors will also be turned off sequentially at different times. While the effective on duty cycle for some fuel injector may or may not overlap the on duty cycle of some other fuel injector, typically the on transitions for the different fuel injectors will not occur at the same instant and off transitions for these fuel injectors will also not be required to be at the same instant.

Figure 3:
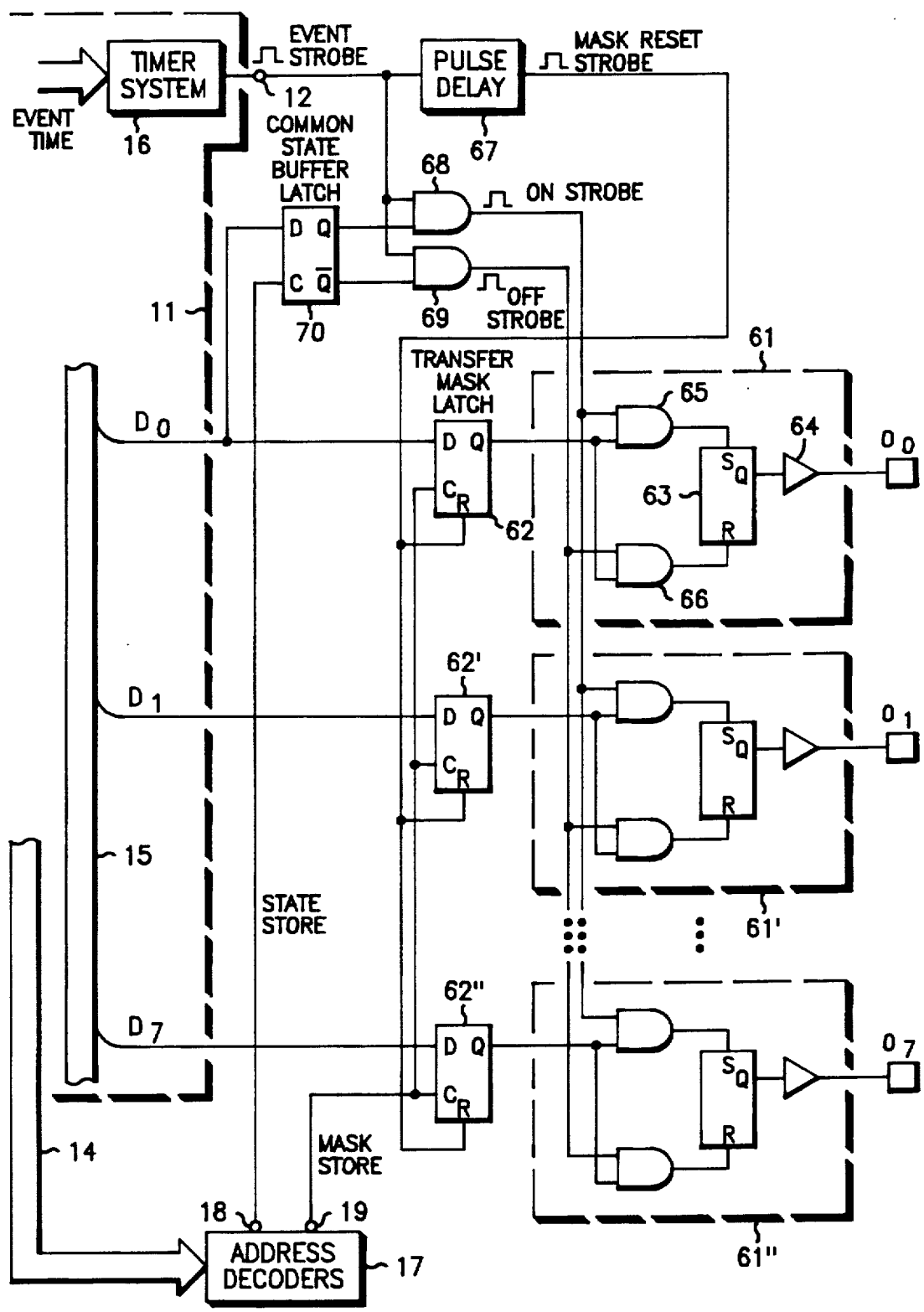
FIG. 3 is a schematic diagram of a port expansion system in which a single time event signal can be processed to result in separate on and off signals that separately control eight output signals.

In FIG. 3, an action direction port expansion system 60 is shown which illustrates a system such as that discussed in the preceding paragraph. The system 60 in FIG. 3 is illustrated with just a single high resolution timed output signal to be expanded, and components which correspond to the single event timer system 10 shown in FIG. 1 are identified in FIG. 3 with identical reference numerals.

In the system 60, the microprocessor 11 again produces just a single event strobe signal at a terminal 12. In addition, the 8-line data bus 15 provides data inputs to eight different transfer mask latches which control the operation of eight associated output latch means In system 60, an output latch means 61 is associated with a transfer mask 62, and together these form a set of components which are repeated eight times to provide each of the eight output signals $O_0$ through $O_7$. The output latch means 61 comprises a reset/set flip-flop 63 having its output terminal Q coupled through a buffer stage 64 to the output terminal $O_0$. The set input S of the flip-flop 63 is provided by an AND gate 65, while an AND gate 66 has an output providing the input signal to the reset terminal R of the flip-flop 63. The output terminal Q of the mask latch 62 associated with the output latch means 61 has its output terminal Q connected as an input to both of the AND gates 65 and 66.

As was the case for the system 10 in FIG. 1, each of the transfer mask latches 62, 62', etc., for the system 60 have their clock input terminals C connected to the mask store signal terminal 19, and the data terminals of these mask latches are connected to an associated one of the data lines $D_0$ through $D_7$. However, each of the mask latches now also has a reset terminal R. All of the mask latch terminals R are all connected in common and receive their input from a mask reset strobe signal produced by a pulse delay circuit 67 which has its input connected to the event strobe terminal 12. In addition, the event strobe terminal 12, at which the high resolution event strobe signal is produced, is also connected as an input to AND gates 68 and 69. The AND gate 68 receives an input from the Q terminal of a common state buffer latch 70, and AND gate 69 receives an input from the not-Q terminal of the latch 70. The common state latch 70 has its data terminal connected to just a single one of the eight data lines, such as data line $D_0$, while a clock terminal C of the buffer latch 70 is connected to the terminal 18 so as to receive the state store signal provided at that terminal. The operation of the system 60 will now be explained in detail.

In the system 60, again separate mask transfer latches 62 are provided for each of the output latch means 61 so as to separately enable the switching of the outputs $O_0$ through $O_7$. However, now the event strobe signal at the terminal 12 is ANDed with the Q and not-Q outputs of the common state buffer latch 70 so as to produce effective on or off strobe signals as the respective outputs of the AND gates 68 and 69. The effect is that now for any event strobe pulse at the terminal 12, any of the output latch means 61 can be set either on or off, but the flexibility of setting one of the outputs to an effective on state while responding to this same strobe pulse at the terminal 12 by setting another of the output latch means 61 to an off logic state is not possible. However, the system 60 has saved providing separate state buffer latches to be associated with each one of the transfer mask latches 62. In some instances, where, due to the sequential nature of the outputs to be produced, it is not necessary to have the flexibility of setting any two outputs to either an on or off state in response to any single event strobe pulse, the system 60 shown in FIG. 3 can be used.

A feature of the system 60 in FIG. 3 is the automatic resetting of the mask latches 62 by a delayed mask reset strobe pulse produced by the pulse delay circuit 67. In essence, this results in having the microprocessor 11 determine which of the output latch means 61 is to respond to a strobe pulse, but then making sure that none of these output latch means 61 respond to a subsequent strobe pulse unless the microprocessor has subsequently generated proper mask store and state signals at the terminals 18 and 19, in combination with the appropriate data on the data bus 15, so as to re-enable an output latch means due to the operation of the mask latches 62. Thus, this automatic clearing of all of the mask latches 62 to zero blocks further action and, therefore, requires another deliberate mask store signal and proper data on bus 15 to be provided to the mask latches before another output latch means can change its output in response to an event strobe signal. This provides falsing immunity for the system 60 shown in FIG. 3 in that unintentional responding of the output latch means 61 to strobe pulses can be minimized. Of course, this resetting feature can be utilized in any of the systems previously discussed and will be shown in both of the subsequent systems to be discussed.

Before discussing the next system, it should be noted that all systems disclosed herein deal with the expansion of at least one high resolution timed output signal of a microprocessor. While this has primary application when the output signal is provided at a dedicated output port of the microprocessor, some circuitry illustrated in the expansion systems discussed herein could be incorporated into the microprocessor by a re-design of the microprocessor internal configuration. Thus, systems which utilize substantially the same structure as any of the presently-disclosed systems, but merely incorporate portions of this structure within a microprocessor, can also effectively utilize many of the basic principles of the present invention.

Figure 4:
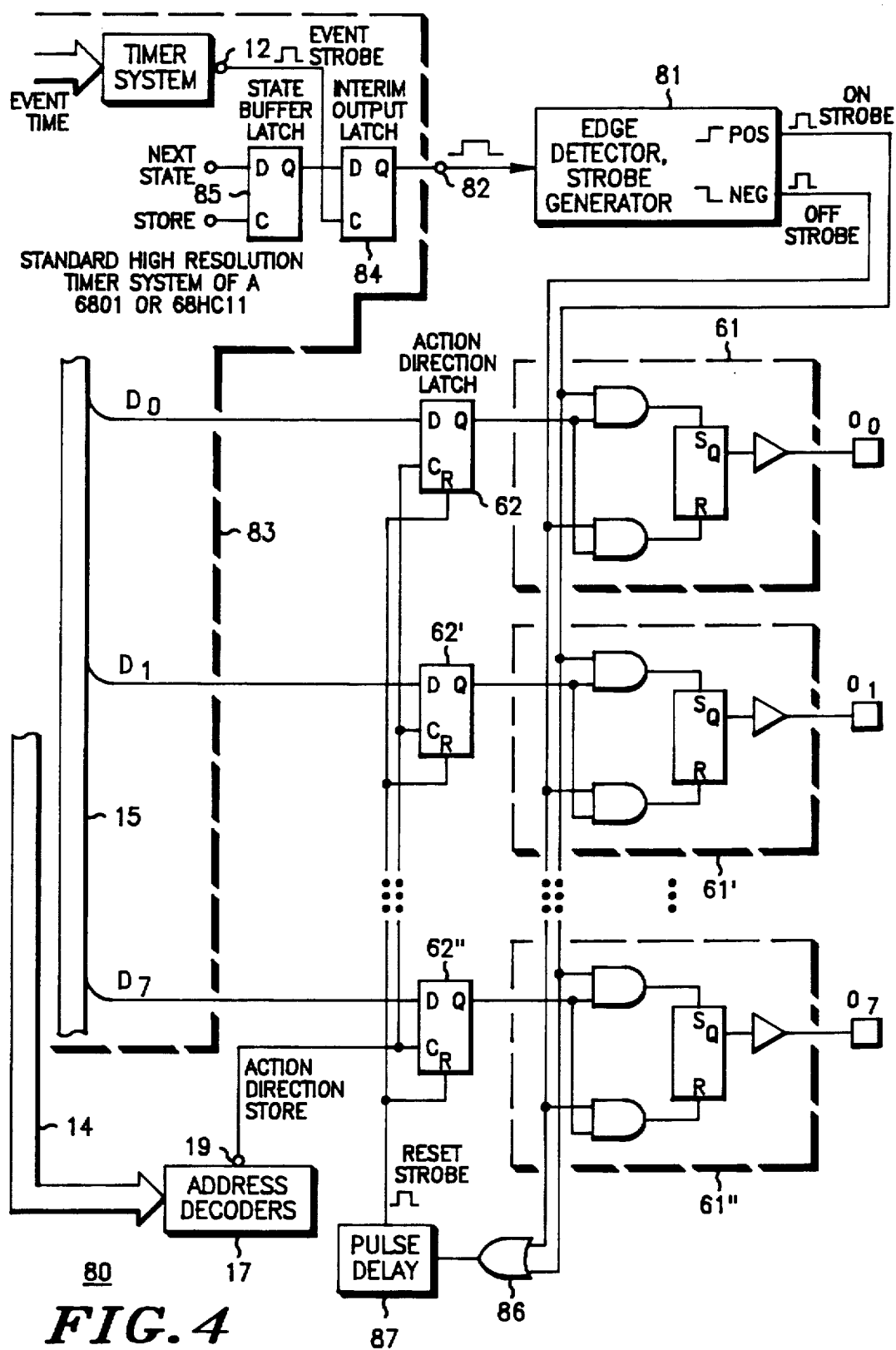
FIG. 4 is an expansion port system similar to FIG. 3 wherein the on and off signals are produced by an edge detector external to the microprocessor.

Referring now to FIG. 4, an action direction port expansion system 80 is illustrated which, in many respects, is similar to the system 60 illustrated in FIG. 3. In the system 80, eight output latch means are illustrated which directly correspond to the configuration illustrated for the output latch means 61 shown in FIG. 3 and, therefore, are identified by the same reference numeral. In addition, the configuration for the transfer mask latches 62 associated with each of the output latch means 61 is also identical, except that now these are identified by the term "action direction latches" rather than "transfer mask latches". This alternate wording is utilized since these latches really direct or identify which of the output latch means are to proceed with a change of state in response to receipt of on or off strobe pulses, such as those produced in the system 60 in FIG. 3. The system 80 also utilizes on and off strobe pulses which are now provided by an edge detector strobe generator 81 in FIG. 4, rather than the AND gates 68 and 69 in FIG. 3. The edge detector strobe generator 81 essentially receives a single output signal provided at a high resolution timed output terminal 82 of a microprocessor 83.

The microprocessor 83 is similar in construction to the microprocessor 11 used in the systems 60 and 10 in FIGS. 3 and 1, respectively. However, now the high resolution event strobe terminal 12 is internal to the microprocessor 83 and provides an input to the clock terminal C of an interim output latch 84 whose Q output provides the signal at the terminal 82. A data terminal D of the latch 84 receives its information from the Q output terminal of a state buffer latch 85 which directly corresponds to the common state buffer latch 70, except that now the state input to the D terminal of this latch and the store signal to the clock terminal of this latch are supplied internal to and directly by the microprocessor rather than the address decoder 17. In addition to the above-noted changes, each of the on and off strobe signals provided by the edge detector strobe generator 81 is now combined via an OR gate 86 to produce an output signal that is an input to a pulse delay circuit 87 which provides the reset strobe signal provided to the reset terminals R of the action direction latches 62.

The system 80 shown in FIG. 4 shows the action direction port concept of the present invention interfaced to a 6801-type or 68HC11-type microprocessor with a high resolution timer output signal. The initial interface structure is provided by virtue of the edge detector strobe generator 81. Essentially, the event strobe signal at the terminal 12 is now combined, by the interim output latch 84, with the output of the state buffer latch 85 so as to produce a signal at the terminal 82 having a rising edge corresponding to a desired on time and a trailing edge corresponding to a desired off time. Thus, only a single output pin of the microprocessor 83 is required while separate on and off information is provided at this terminal by the signal at the terminal 82. This single signal is then essentially de-multiplexed by the edge detector strobe generator 81 which responds to rising edge transitions to produce an on strobe pulse and separately responds to falling edge transitions to produce an off strobe pulse. Each of these on and off strobe pulses is separately coupled to each of the output latch means 61. The advantage of the system 80 is that more components are now positioned within the microprocessor 83. In addition, providing such a rising and trailing edge signal, such as the signal at the terminal 82, is conventional, and therefore a conventional rising and falling edge detector can be utilized for the edge detector and strobe generator 81. It is believed that some microprocessors have circuitry which specifically lend themselves more readily to the implementation of the system 80 shown in FIG. 4 than that of the system 60 shown in FIG. 3.

If the system 80 in FIG. 4 is only to control on-events, then the trailing or negative edge transition produced by the off strobe can be automatically discounted by not connecting the off strobe to any of the latch means 61. Also, if a single high resolution timer output signal, such as the signal at terminal 82, is to control both on and off events, then the automatic clearing of the action direction latches 62 by the OR gate 86 and pulse delay 87 provides the needed safeguard to prevent any misdirected on or off actions. This occurs since direction of the on or off action in the system 80 can only occur through the deliberate storage of a high or one logic state in the action direction latches 62 for each desired action event (state change) which is to occur.

Figure 5:
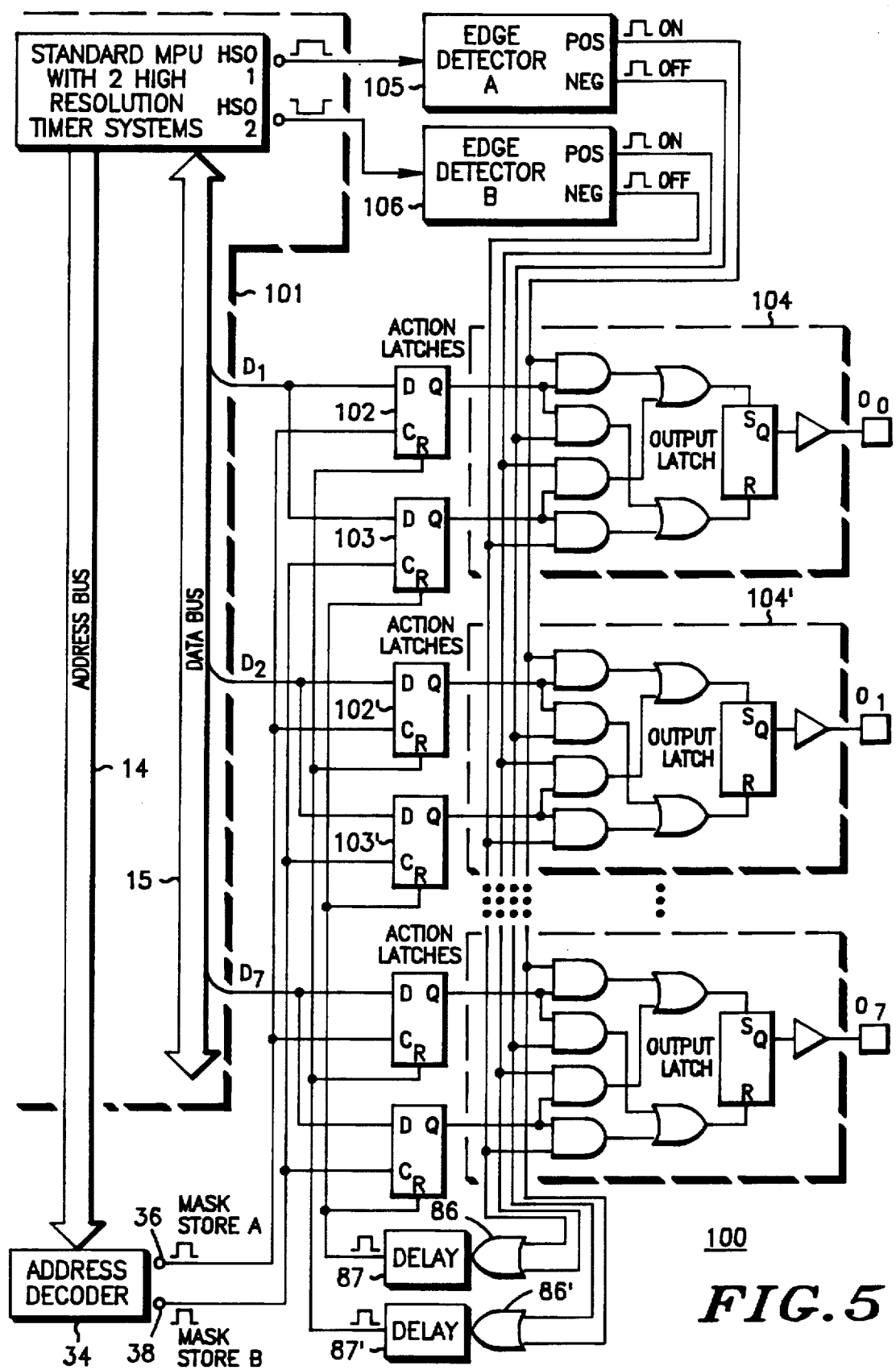
FIG. 5 is a schematic diagram of a port expansion system in which two independent time event outputs of a microprocessor can separately and independently control each of eight different output signals.

Referring now to FIG. 5, a full conceptual implementation of an action direction port expansion system 100 is illustrated which interfaces with a standard bus microcomputer system which provides two different high resolution timed outputs HS01 and HS02. The system 100 essentially represents expanding the system 80 to accommodate two high resolution outputs provided by a microprocessor 101. The microprocessor 101 provides a first rising and falling edge transition high resolution signal HS01 and a second similar falling and rising edge independent high resolution signal HS02. Each of these signals is separately connected to an associated A or B edge detector 105 or 106 with each edge detector developing separate on and off signals. Each of the edge detectors 105 and 106 functions substantially identical to the FIG. 4 edge detector strobe generator 81. Separate action latches 102 and 103 are provided to essentially identify if an output latch means 104, associated with the action latches 102 and 103, should react to either of the on/off signals produced by an A-channel edge detector 105 or the on/off signals produced by a B-channel edge detector 106. Automatic reset circuitry for clearing each of the action latches 102 and 103 is implemented in a manner identical to that for the action direction latches 62 shown in the system 80. An address decoder 34 for the system 100 directly corresponds to the address decoder 34 for the system 30 since separate mask store signals A and B are provided for each associated action latch 102 and 103, respectively. Thus, the reference numbers 34, 36 and 38 have been utilized in FIG. 5 for the address decoder and its output terminals. In addition, reference numerals 86 and 87, and prime notation of these numerals, have been utilized for the reset circuitry in FIG. 100 so as to indicate the correspondence of this structure to the corresponding reset structure in the system 80. For the system 100, any of the outputs $O_0$–$O_7$ can have its state changed directly in response to and substantially coincident with any of HS01 or HS02 signal transitions. The microprocessor 101 selects which outputs are to be changed by selectively enabling the output latch means 104 with respect to the A or B on/off signals. The microprocessor 101 also selects what the next output state of the output latch means should be.

While specific embodiments of the present invention have been shown and described, further modifications and improvements will occur to those skilled in the art. All such modifications which retain the basic underlying principles disclosed and claimed herein are within the scope of this invention.

I claim:

1. An action direction port expansion circuit for directing timed output signal transitions/pulses to implement desired changes at a plurality of output ports, comprising:

first event timer terminal for receiving first event signal transitions/pulses;

a plurality of output latch means each coupled to said first event timer terminal and each providing an associated output signal having any of at least two different states, each of said output latch means coupled to said first event signal transitions/pulses, each of said output latch means selectively in response to said first event signal transitions/pulses, and also in response to being enabled by receipt of an associated first event enable signal, changing the state of the output signal associated with said output latch means to a predetermined state at a time determined by the time occurrence of said first event signal transitions/pulses;

means coupled to each of said output latch means for providing output state data which determines said predetermined state to which said output latch means output signals are to be changed to;

means for providing selection data for determining which of said output latch means should respond to said first event signal transitions/pulses by changing the state of the output latch means output signal; and a plurality of first event action (transfer mask) latch means coupled to said selection data means for receiving said selection data therefrom, each one of said first event action latch means associated with and coupled to a separate associated one of said plurality of output latch means for selectively providing, as a latched output of said each one of said first event action latch means, said associated first event enable signal which is provided to said associated one of said output latch means, said provided first event enable signal enabling said associated one of said output latch means while others of said output latch means are unaffected by said first event enable signal which enables said associated one of said output latch means, wherein the time occurrences of said first event signal transitions/pulses provide precise timing information for changing the states of any of said output latch means output signals while said plurality of first event action latch means, via said first event enable signals, determine, in accordance with said received selection data, which ones of said output latch means are to be enabled to react to both said first event signal transitions/pulses and said output state data and change the states of the enabled output latch means output signals.

2. An action direction port expansion circuit according to claim 1 wherein each of said first event action latch means has its latched output separately determined in accordance with said received selection data.

3. An action direction port expansion circuit according to claim 2 wherein each of said first event action latch means receives a common mask store signal for enabling the action latch means output to be set in accordance with a signal received from a separate associated input data line provided to each of said first event action latch means.

4. An action direction port expansion circuit according to claim 3 which includes at least one buffer latch means in addition to said first event action latch means, said buffer latch means providing said output state data as an output signal, coupled to at least one of said output latch means, that determines what state said at least one of said output latch means can be set to in response to each of said first event signal transitions/pulses.

5. An action direction port expansion circuit according to claim 4 wherein there is a plurality of said buffer latch means, each associated with and providing its output signal to a separate one of said output latch means for separate control and determination of the states of the output signal thereof.

6. An action direction port expansion circuit according to claim 4 wherein said buffer latch means comprises a single common buffer latch means which receives said output state data and said first event signal transitions/pulses and selectively produces, in response thereto, two different event pulses each having a time occurrence determined by the time occurrence of said first event signal transitions/pulses, each of said two different event pulses indicative of a different desired state for the output signal of said output latch means to be provided in response thereto.

7. An action direction port expansion circuit according to claim 6 wherein said common buffer latch means provides each of said two different event pulses at separate associated terminals, each of which is separately coupled to each of said plurality of output latch means.

8. An action direction port expansion circuit according to claim 1 wherein each of said output latch means comprises a set-reset device which can be set to one state by receipt of a first signal and can be reset to a different state by receipt of a different signal.

9. An action direction port expansion circuit according to claim 1 which includes action latch reset means for resetting each of said plurality of action latches in response to and at a predetermined time after said first event signal transitions/pulses are coupled to said plurality of output latch means.

10. An action direction port expansion circuit according to claim 1 wherein said first event timer terminal is coupled to an input of a high resolution timer means, and wherein said first event signal transitions/pulses are received by said high resolution timer means which includes a buffer latch means, coupled to said output state data means, that receives said output state data for determining which state said output latch means can be set to for each occurrence of said first event signal transitions/pulses, and wherein said high resolution timer means provides an output signal, coupled to said output latch means, having a rising/falling transition corresponding to a desired on-state and a falling/rising transition corresponding to a desired off state for said output signals of said output latch means.

11. An action direction port expansion circuit according to claim 10 which includes an edge detector means coupled to said high resolution timer means for receiving said output signal thereof and providing in response to said rising/falling edge an on-strobe pulse and in response to said falling/rising edge and off-strobe pulse, each of said on and off-strobe pulses being coupled to each one of said output latch means.

12. An action direction port expansion circuit according to claim 1 which includes at least a second event timer terminal for receiving second event signal transitions/pulses, each of said plurality of output latches, in addition to being coupled to said first event terminal by a first data bus line, also has a separate additional data bus line coupling each of said output latches to said second event timer terminal for receiving said second event signal transitions/pulses, each of said output latches selectively in response to second event signal transition/pulses, and also in response to receipt of an associated second event enable signal, setting the state of the output signal associated with said output latch means to a predetermined state at a time determined by the time occurrence of said second event signal transitions/pulses, said expansion circuit including means for providing said second event enable signals.

13. An action direction port expansion circuit according to claim 12 wherein said second event enable signal is identical to said first event enable signal.

14. An action direction port expansion circuit for directing timed output signal transitions/pulses to implement desired changes at a plurality of output ports, comprising:

first event timer terminal for receiving first event signal transitions/pulses;

a plurality of output latch means each coupled to said first event timer terminal and each providing an associated output signal having any of at least two different states, each of said output latch means coupled to said first event signal transitions/pulses, each of said output latch means selectively in response to said first event signal transitions/pulses, and also in response to being enabled by receipt of an associated first event enable signal, changing the state of the output signal associated with said output latch means to a predetermined state at a time determined by the time occurrence of said first event signal transitions/pulses;

second event timer terminal for receiving second event signal transitions/pulses;

each of said plurality of output latch means also being coupled to said second event timer terminal, each of said output latch means coupled to said second event signal transitions/pulses, each of said output latch means selectively in response to said second event signal transitions/pulses and also in response to being enabled by receipt of an associated second event enable signal, changing the state of the output signal associated with said output latch means to a predetermined state at a time determined by said second event signal transitions/pulses;

means coupled to each of said output latch means for providing output state data which determines said predetermined state to which said output latch means output signals are to be changed to;

means for providing selection data for determining which of said output latch means should respond to said first and second event signal transitions/pulses by changing the state of the output latch means output signal; and a plurality of first event action (transfer mask) latch means coupled to said selection data means for receiving said selection data therefrom, each one of said first event action latch means associated with and coupled to a separate associated one of said plurality of output latch means for selectively providing, as a latched output of said each one of said first event action latch means, said associated first event enable signal which is provided to said associated one of said output latch means, said provided enable signal enabling said associated one of said output latch means while others of said output latch means are unaffected by said first event enable signal which enables said associated one of said output latch means, and a plurality of second event action (transfer mask) latch means coupled to said selection data means for receiving said selection data therefrom, each one of said second event action latch means associated with and coupled to a separate associated one of said plurality of output latch means for selectively providing, as a latched output of said each one of said second event action latch means, said associated second event enable signal which is provided to said associated one of said output latch means, said provided enable signal enabling said associated one of said output latch means while others of said output latch means are unaffected by said second event enable signal which enables said associated one of said output latch means, wherein the time occurrences of said first and second event signal transitions/pulses provide precise timing information for changing the states of any of said output latch means output signals while said plurality of first and second event action latch means, via said first and second event enable signals, determine, in accordance with said received selection data, which ones of said output latch means are to be enabled to react to said first and second event signal transitions/pulses and said output state data, respectively, and change the output states of the output latch means output signals.

15. An action direction port expansion circuit according to claim 14 wherein said selection data means includes a microprocessor, and wherein each of said first and second event action latch means has its latched output separately determined in accordance with said received selection data which is provided by said microprocessor.

16. An action direction port expansion circuit according to claim 15 wherein each of said first event action latch means receives a first common mask store signal for enabling the action latch means output of said first event action latch means to be set in accordance with a signal received via a separate associated input data line provided to each of said first event action latch means, and wherein each of said second event action latch means is similarly configured to receive a second common mask store signal.

17. An action direction port expansion circuit according to claim 16 which includes at least one buffer latch means in addition to said first and second action latch means, said buffer latch means providing said output state data as an output signal, coupled to at least one of said output latch means, that determines what state of said at least one of said output latch means can be set to in response to each of said first event signal transitions/pulses.

18. An action direction port expansion circuit according to claim 14 which includes action latch reset means for resetting each of said plurality of first event and second event action latches in response to and at a predetermined time after said first and second event signal transitions/pulses, respectively, are effectively coupled to said plurality of output latch means.

19. An action direction port expansion circuit according to claim 14 wherein at least one of said first and second event timer terminals is coupled to an input of an associated high resolution timer means, and wherein at least one of said first and second event signal transitions/pulses are received by said associated high resolution timer means which includes a buffer latch means, coupled to said output data means, that receives said output state data for determining which state said output latch means can be set to for each occurrence of said at least one of said first and second event signal transitions/pulses, and wherein said high resolution timer means provides an output signal, coupled to said output latch means, having a rising/falling transition corresponding to a desired on state and a falling/rising transition corresponding to a desired off state for said output signals of said output latch means.

20. An action direction port expansion system for directing timed output signal transitions/pulses to implement desired changes at a plurality of output ports, comprising:

microprocessor means which provides, at a dedicated output pin corresponding to a first event timer terminal, first event signal transitions/pulses;

a plurality of output latch means each coupled to said first event timer terminal and each providing an associated output signal having any of at least two different states, each of said output latch means coupled to said first event signal transitions/pulses, each of said output latch means selectively in response to said first event signal transitions/pulses, and also in response to being enabled by receipt of an associated first event enable signal, changing the state of the output signal associated with said output latch means to a predetermined state at a time determined by the time occurrence of said first event signal transitions/pulses;

means coupled to each of said output latch means for providing output state data which determines said predetermined state to which said output latch means output signals are to be changed to;

means for providing selection data for determining which of said output latch means should respond to said first event signal transitions/pulses by changing the state of the output latch means output signal; and a plurality of first event action (transfer mask) latch means coupled to said selection data means for receiving said selection data therefrom, each one of said first event action latch means associated with and coupled to a separate associated one of said plurality of output latch means for selectively providing, as a latched output of said each one of said first event action latch means, said associated first event enable signal which is provided to said associated one of said output latch means, said provided first event enable signal enabling said associated one of said output latch means while others of said output latch means are unaffected by said first event enable signal which enables said associated one of said output latch means, wherein the time occurrences of said first event signal transitions/pulses provide precise timing information for changing the states of any of said output latch means output signals while said plurality of first event action latch means, via said first event enable signals, determine, in accordance with said received selection data, which ones of said output latch means are to be enabled to react to both said first event signal transitions/pulses and said output state data and change the states of the enabled output latch means output signals.

21. An action direction port expansion system according to claim 20 wherein each of said first event action latch means has its latched output separately determined in accordance with said received selection data which is provided on a data bus of said microprocessor having at least one data line connected to each of said first event action latch means.

22. An action direction port expansion system according to claim 21 which includes an address decoder means coupled to said microprocessor and said plurality of first event action latch means, and wherein each of said first event action latch means receives a common mask store signal, from said address decoder means, for enabling the action latch means output to be set in accordance with a signal received via a separate associated input data line, connected to said microprocessor data bus, provided to each of said first event action latch means, and wherein an address bus of said microprocessor provides input signal information to said address decoder means which, in response thereto, provides said common mask store signal.

23. An action direction port expansion circuit for directing timed output signal transitions/pulses to implement desired changes at a plurality of output ports, comprising:

first event timer terminal for receiving first event signal transitions/pulses;

a plurality of output latch means each coupled to said first event timer terminal and each providing an associated output signal having any of at least two different states, each of said output latch means coupled to said first event signal transitions/pulses, each of said output latch means selectively in response to said first event signal transitions/pulses, and also in response to being enabled by receipt of an associated first event enable signal, changing the state of the output signal associated with said output latch means to a predetermined state at a time determined by the time occurrence of said first event signal transitions/pulses;

means coupled to each of said output latch means for receiving output state data which determines said predetermined state to which said output latch means output signals are to be changed to;

means for providing selection data for determining which of said output latch means should respond to said first event signal transitions/pulses by changing the state of the output latch means output signal; and a plurality of first event action (transfer mask) latch means coupled to said selection data means for receiving said selection data therefrom, each one of said first event action latch means associated with and coupled to a separate associated one of said plurality of output latch means for selectively providing, as a latched output of said each one of said first event action latch means, said associated first event enable signal which is provided to said associated one of said output latch means, said provided first event enable signal enabling said associated one of said output latch means while others of said output latch means are unaffected by said first event enable signal which enables said associated one of said output latch means, wherein the time occurrences of said first event signal transitions/pulses provide precise timing information for changing the states of any of said output latch means output signals while said plurality of first event action latch means, via said first event enable signals, determine, in accordance with said received selection data, which ones of said output latch means are to be enabled to react to both said first event signal transitions/pulses and said output state data and change the states of the enabled output latch means output signals.

24. An action direction port expansion circuit for directing timed output signal transitions/pulses to implement desired changes at a plurality of output ports, comprising:

first event timer terminal for receiving first event signal transitions/pulses;

a plurality of output latch means each coupled to said first event timer terminal and each providing an associated output signal having any of at least two different states, each of said output latch means coupled to said first event signal transitions/pulses, each of said output latch means selectively in response to said first event signal transitions/pulses, and also in response to being enabled by receipt of an associated first event enable signal, changing the state of the output signal associated with said output latch means to a predetermined state at a time determined by the time occurrence of said first event signal transitions/pulses;

second event timer terminal for receiving second event signal transitions/pulses;

each of said plurality of output latch means also being coupled to said second event timer terminal, each of said output latch means coupled to said second event signal transitions/pulses, each of said output latch means selectively in response to said second event signal transitions/pulses and also in response to being enabled by receipt of an associated second event enable signal, changing the state of the output signal associated with said output latch means to a predetermined state at a time determined by said second event signal transitions/pulses;

means coupled to each of said output latch means for providing output state data which determines said predetermined state to which said output latch means output signals are to be changed to;

means for providing selection data for determining which of said output latch means should respond to said first and second event signal transitions/pulses by changing the state of the output latch means output signal; and a plurality of first event action (transfer mask) latch means coupled to said selection data means for receiving said selection data therefrom, each one of said first event action latch means associated with and coupled to a separate associated one of said plurality of output latch means for selectively providing, as a latched output of said each one of said first event action latch means, said associated first event enable signal which is provided to said associated one of said output latch means, said provided enable signal enabling said associated one of said output latch means while others of said output latch means are unaffected by said first event enable signal which enables said associated one of said output latch means, and a plurality of second event action (transfer mask) latch means coupled to said selection data means for receiving said selection data therefrom, each one of said second event action latch means associated with and coupled to a separate associated one of said plurality of output latch means for selectively providing, as a latched output of said each one of said second event action latch means, said associated second event enable signal which is provided to said associated one of said output latch means, said provided enable signal enabling said associated one of said output latch means while others of said output latch means are unaffected by said second event enable signal which enables said associated one of said output latch means, wherein the time occurrences of said first and second event signal transitions/pulses provide precise timing information for changing the states of any of said output latch means output signals while said plurality of first and second event action latch means, via said first and second event enable signals, determine, in accordance with said received selection data, which ones of said output latch means are to be enabled to react to said first and second event signal transitions/pulses and said output state data, respectively, and change the output states of the output latch means output signals.

25. An action direction port expansion system for directing timed output signal transitions/pulses to implement desired changes at a plurality of output ports, comprising:

microprocessor means which provides, at a dedicated output pin corresponding to a first event timer terminal, first event signal transitions/pulses;

a plurality of output latch means each coupled to said first event timer terminal and each providing an associated output signal having any of at least two different states, each of said output latch means coupled to said first event signal transitions/pulses, each of said output latch means selectively in response to said first event signal transitions/pulses, and also in response to being enabled by receipt of an associated first event enable signal, changing the state of the output signal associated with said output latch means to a predetermined state at a time determined by the time occurrence of said first event signal transitions/pulses;

means coupled to each of said output latch means for providing output state data which determines said predetermined state to which said output latch means output signals are to be changed to;

means for providing selection data for determining which of said output latch means should respond to said first event signal transitions/pulses by changing the state of the output latch means output signal; and a plurality of first event action (transfer mask) latch means coupled to said selection data means for receiving said selection data therefrom, each one of said first event action latch means associated with and coupled to a separate associated one of said plurality of output latch means for selectively providing, as a latched output of said each one of said first event action latch means, said associated first event enable signal which is provided to said associated one of said output latch means, said provided first event enable signal enabling said associated one of said output latch means while others of said output latch means are unaffected by said first event enable signal which enables said associated one of said output latch means, wherein the time occurrences of said first event signal transitions/pulses provide precise timing information for changing the states of any of said output latch means output signals while said plurality of first event action latch means, via said first event enable signals, determine, in accordance with said received selection data, which ones of said output latch means are to be enabled to react to both said first event signal transitions/pulses and said output state data and change the states of the enabled output latch means output signals.

* * * * *

UNITED STATES PATENT AND TRADEMARK OFFICE
CERTIFICATE OF CORRECTION

PATENT NO. : 5,060,134

DATED : October 22, 1991

INVENTOR(S) : Roy E. Hunninghaus

It is certified that error appears in the above-identified patent and that said Letters Patent is hereby corrected as shown below:

Claim 25, col. 21, line 27, the word "providing" should be deleted and --receiving-- inserted.

Signed and Sealed this

Twenty-third Day of February, 1993

*Attest:*

STEPHEN G. KUNIN

*Attesting Officer*     *Acting Commissioner of Patents and Trademarks*